US012260755B2

United States Patent
Zhou et al.

(10) Patent No.: US 12,260,755 B2
(45) Date of Patent: Mar. 25, 2025

(54) METHOD OF CONTROLLING AUTONOMOUS VEHICLE AND ELECTRONIC DEVICE

(71) Applicant: Apollo Intelligent Driving Technology (Beijing) Co., Ltd., Beijing (CN)

(72) Inventors: Shiqi Zhou, Beijing (CN); Jingkai Chen, Beijing (CN); Liang Wang, Beijing (CN); Yunpeng Wang, Beijing (CN); Zhenyu Li, Beijing (CN)

(73) Assignee: Apollo Intelligent Driving Technology (Beijing) Co., Ltd, Beijing (CN)

( * ) Notice: Subject to any disclaimer, the term of this patent is extended or adjusted under 35 U.S.C. 154(b) by 241 days.

(21) Appl. No.: 17/968,347

(22) Filed: Oct. 18, 2022

(65) Prior Publication Data
US 2023/0044125 A1 Feb. 9, 2023

(30) Foreign Application Priority Data

Oct. 19, 2021 (CN) .......................... 202111218573.8

(51) Int. Cl.
*G08G 1/0967* (2006.01)
*B60K 35/00* (2024.01)
(Continued)

(52) U.S. Cl.
CPC ....... *G08G 1/096725* (2013.01); *B60K 35/00* (2013.01); *G07C 5/008* (2013.01);
(Continued)

(58) Field of Classification Search
CPC ....... G08G 1/096725; G08G 1/096775; G08G 1/0969; G08G 1/202; G08G 1/096741;
(Continued)

(56) References Cited

U.S. PATENT DOCUMENTS

2011/0306338 A1 12/2011 Ozaki et al.
2018/0095457 A1* 4/2018 Lee .................. G08G 1/096741
(Continued)

FOREIGN PATENT DOCUMENTS

| CN | 109376987 A | 2/2019 |
|---|---|---|
| CN | 110782148 A | 2/2020 |

(Continued)

OTHER PUBLICATIONS

Chu, W., Wuniri, Q., Du, X. et al. Cloud Control System Architectures, Technologies and Applications on Intelligent and Connected Vehicles: a Review. Chin. J. Mech. Eng. 34, 139 (2021). https://doi.org/10.1186/s10033-021-00638-4.*

(Continued)

*Primary Examiner* — Brian P Sweeney
(74) *Attorney, Agent, or Firm* — Keating & Bennett, LLP (57) ABSTRACT

A method of controlling an autonomous vehicle and an electronic device are provided, which relate to a field of artificial intelligence technology, and in particular to a field of autonomous driving technology. The method includes: acquiring a vehicle state configuration information from a cloud; enabling a task receiving function of the vehicle, in response to the vehicle state configuration information indicating that the vehicle is in an automatic operation state; acquiring a task information from the cloud in response to the task receiving function being enabled; and controlling the vehicle according to the task information.

20 Claims, 7 Drawing Sheets

(51) Int. Cl.
    *G07C 5/00*      (2006.01)
    *G07C 5/08*      (2006.01)
    *G08G 1/00*      (2006.01)
    *G08G 1/0969*    (2006.01)
    *B60K 35/28*     (2024.01)
    *B60K 35/29*     (2024.01)
    *B60K 35/65*     (2024.01)

(52) U.S. Cl.
    CPC ..... *G07C 5/0816* (2013.01); *G08G 1/096775* (2013.01); *G08G 1/0969* (2013.01); *G08G 1/202* (2013.01); *B60K 35/28* (2024.01); *B60K 35/29* (2024.01); *B60K 35/65* (2024.01); *B60K 2360/166* (2024.01); *B60K 2360/188* (2024.01); *B60K 2360/731* (2024.01)

(58) Field of Classification Search
    CPC ......... G08G 1/09675; G08G 1/096708; B60K 35/00; B60K 35/28; B60K 35/29; B60K 35/65; B60K 2360/166; B60K 2360/188; B60K 2360/731; G07C 5/008; G07C 5/0816; B60W 60/00253; B60W 2556/45; B60W 2756/10; B60W 50/14; B60W 2050/146; G06Q 50/40; G06Q 10/063; G06Q 10/20; G06Q 2220/00; H04W 4/44; H04L 67/1097; H04L 67/34; H04L 67/125
    See application file for complete search history.

(56) References Cited

U.S. PATENT DOCUMENTS

2020/0082304 A1*  3/2020  Xia .................. G06Q 10/06315
2020/0312149 A1   10/2020 Umeda

FOREIGN PATENT DOCUMENTS

| CN | 111703301 A | 9/2020 |
| CN | 111752268 A | 10/2020 |
| CN | 113264036 A | 8/2021 |
| CN | 113492872 A | 10/2021 |
| CN | 113501009 A | 10/2021 |
| JP | 2017-165277 A | 9/2017 |

OTHER PUBLICATIONS

Official Communication issued in corresponding European Patent Application No. 22202492.9, mailed on Feb. 21, 2023.
"What is Remote Vehicle Monitoring?", https://web.archive.org/web/20210620065450/https://www.azuga.com/blog/what-is-remote-vehicle-monitoring, Sep. 16, 2020, 4 pages.
Official Communication issued in Chinese Patent Application No. 2021111218573.8, mailed on Jun. 14, 2022.

* cited by examiner

METHOD OF CONTROLLING AUTONOMOUS VEHICLE AND ELECTRONIC DEVICE

This application claims priority to Chinese Patent Application No. 202111218573.8, filed on Oct. 19, 2021, the entire content of which is incorporated herein in its entirety by reference.

TECHNICAL FIELD

The present disclosure relates to a field of artificial intelligence technology, and in particular to a field of autonomous driving technology.

BACKGROUND

An application of an autonomous vehicle is more and more extensive. For example, the autonomous vehicle has begun to pick up or drop off a passenger. In related technologies, during a driving process of the autonomous vehicle, a safety officer is required to perform relevant decisions. For example, the safety officer is required to trigger a process of picking up or dropping off the passenger, resulting in insufficient intelligence of the autonomous vehicle.

SUMMARY

The present disclosure provides a method of controlling an autonomous vehicle, an electronic device, a storage medium, a vehicle, and a cloud server.

According to an aspect of the present disclosure, a method of controlling an autonomous vehicle is provided, including: acquiring a vehicle state configuration information from a cloud; enabling a task receiving function of the vehicle, in response to the vehicle state configuration information indicating that the vehicle is in an automatic operation state; acquiring a task information from the cloud in response to the task receiving function being enabled; and controlling the vehicle according to the task information.

According to an aspect of the present disclosure, a method of controlling an autonomous vehicle is provided, including: receiving a state acquisition request from the vehicle; determining a vehicle state configuration information of the vehicle, wherein the vehicle state configuration information is configured to indicate a vehicle state of the vehicle; sending the vehicle state configuration information to the vehicle; in response to a receipt of a task information acquisition request from the vehicle, generating a task information for the vehicle according to the task information acquisition request; and sending the task information to the vehicle.

According to an aspect of the present disclosure, an electronic device is provided, including: at least one processor; and a memory communicatively connected to the at least one processor, wherein the memory stores instructions executable by the at least one processor, and the instructions, when executed by the at least one processor, cause the at least one processor to implement the methods as described in embodiments of the present disclosure.

According to an aspect of the present disclosure, a non-transitory computer-readable storage medium having computer instructions therein is provided, wherein the computer instructions are configured to cause a computer system to implement the methods as described in embodiments of the present disclosure.

According to an aspect of the present disclosure, an autonomous vehicle is provided, including the electronic device as described in embodiments of the present disclosure, wherein the electronic device is configured to implement the methods as described in embodiments of the present disclosure.

According to an aspect of the present disclosure, a cloud server is provided, including the electronic device as described in embodiments of the present disclosure, wherein the electronic device is configured to implement the methods as described in embodiments of the present disclosure.

It should be understood that content described in this section is not intended to identify key or important features in embodiments of the present disclosure, nor is it intended to limit the scope of the present disclosure. Other features of the present disclosure will be easily understood through the following description.

BRIEF DESCRIPTION OF THE DRAWINGS

The accompanying drawings are used to understand the present disclosure better and do not constitute a limitation to the present disclosure, wherein.

DETAILED DESCRIPTION OF EMBODIMENTS

Exemplary embodiments of the present disclosure will be described below with reference to accompanying drawings, which include various details of embodiments of the present disclosure to facilitate understanding and should be considered as merely exemplary. Therefore, those of ordinary skilled in the art should realize that various changes and modifications may be made to embodiments described herein without departing from the scope and spirit of the present disclosure. Likewise, for clarity and conciseness, descriptions of well-known functions and structures are omitted in the following description.

Figure 1:
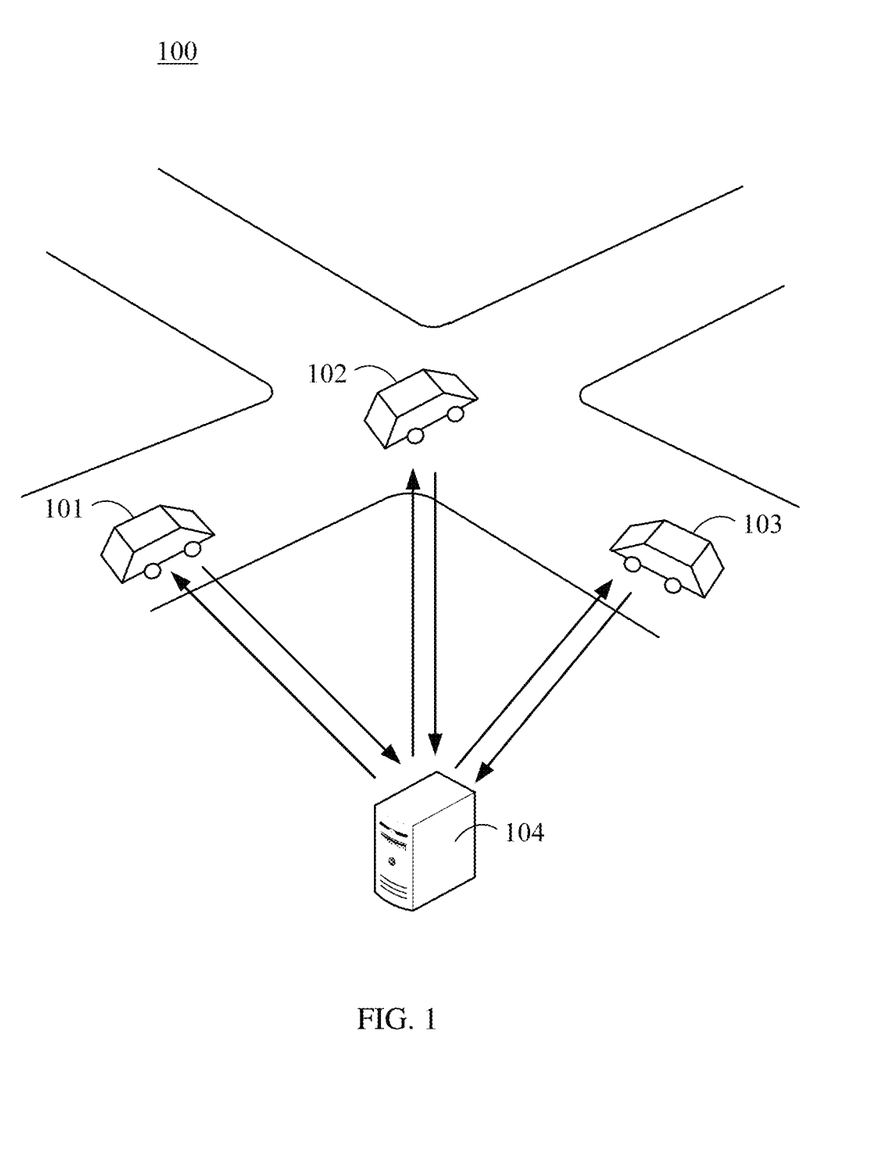
FIG. 1 schematically shows an application scenario of a method and an apparatus of controlling an autonomous vehicle according to embodiments of the present disclosure.

FIG. 1 schematically shows an application scenario of a method and an apparatus of controlling an autonomous vehicle according to embodiments of the present disclosure. It should be noted that FIG. 1 is only an example of an application scenario to which embodiments of the present disclosure may be applied, so as to help those skilled in the art to understand the technical content of the present disclosure, but it does not mean that embodiments of the present disclosure may not be applied to other devices, systems, environment or scenarios.

As shown in FIG. 1, an application scenario 100 of embodiments of the present disclosure includes a plurality of vehicles 101, 102, 103, and a server 104. The vehicles 101, 102, and 103 may be autonomous vehicles.

The server 104 may be a cloud server which is also referred to as a cloud computing server or a cloud host and which is a host product in the cloud computing service system to solve shortcomings of difficult management and weak business scalability in existing physical host and VPS (Virtual Private Server) service. The server 104 may also be a server of a distributed system, or a server combined with a block-chain.

According to embodiments of the present disclosure, the vehicles 101, 102, and 103 may perform data interaction with the server 104.

In embodiments, the server 104 may configure a vehicle state for the vehicle 101, a vehicle state for the vehicle 102, and a vehicle state for the vehicle 103, and store the vehicle state for the vehicle 101 in a vehicle state configuration information corresponding to the vehicle 101, the vehicle state for the vehicle 102 in a vehicle state configuration information corresponding to the vehicle 102, and the vehicle state for the vehicle 103 in a vehicle state configuration information corresponding to the vehicle 103. For example, the vehicle state may include an automatic operation state, a manual operation state, and/or the like. The automatic operation state indicates that the vehicle may automatically receive a task and process the task. The manual operation state indicates that the vehicle needs to receive a task and process the task under a control of a safety officer. The task may include, for example, a task of processing an order, where the order includes, but is not limited to, a passenger order and a freight order.

The vehicle 101 may acquire the vehicle state configuration information corresponding to the vehicle 101 from the server 104, the vehicle 102 may acquire the vehicle state configuration information corresponding to the vehicle 102 from the server 104, and the vehicle 103 may acquire the vehicle state configuration information corresponding to the vehicle 103 from the server 104. In response to the vehicle state configuration information corresponding to the vehicle 101 indicating that the vehicle 101 is in the automatic operation state, a task receiving function of the vehicle 101 may be enabled, in response to the vehicle state configuration information corresponding to the vehicle 102 indicating that the vehicle 102 is in the automatic operation state, a task receiving function of the vehicle 102 may be enabled, and in response to the vehicle state configuration information corresponding to the vehicle 103 indicating that the vehicle 103 is in the automatic operation state, a task receiving function of the vehicle 103 may be enabled. In response to the task receiving function of the vehicle 101 being enabled, the vehicle 101 may send a task information acquisition request to the server 104 to acquire a task information, in response to the task receiving function of the vehicle 102 being enabled, the vehicle 102 may send a task information acquisition request to the server 104 to acquire a task information, and in response to the task receiving function of the vehicle 103 being enabled, the vehicle 103 may send a task information acquisition request to the server 104 to acquire a task information. After receiving the requests, the server 104 may generate a task information corresponding to the vehicle 101 according to the task information acquisition request of the vehicle 101, a task information corresponding to the vehicle 102 according to the task information acquisition request of the vehicle 102, and a task information corresponding to the vehicle 103 according to the task information acquisition request of the vehicle 103, and send the task information of the task corresponding to the vehicle 101 to the vehicle 101, the task information of the task corresponding to the vehicle 102 to the vehicle 102, and the task information of the task corresponding to the vehicle 103 to the vehicle 103. After receiving the task information corresponding to the vehicle 101, the vehicle 101 may perform a corresponding control operation according to the task information, after receiving the task information corresponding to the vehicle 102, the vehicle 102 may perform a corresponding control operation according to the task information, and after receiving the task information corresponding to the vehicle 103, the vehicle 103 may perform a corresponding control operation according to the task information.

In embodiments, the vehicle 101, 102, or 103 may upload an energy consumption information to the server 104. The server 104 may determine whether an energy consumption of the vehicle 101, 102 or 103 exceeds an energy consumption threshold according to the energy consumption information of the vehicle 101, 102, or 103. If the energy consumption of the vehicle 101, 102, or 103 exceeds the energy consumption threshold, the vehicle is configured to be in a standby state by setting the vehicle state configuration information of the vehicle. Then, it is possible to send a dispatching instruction to the vehicle in the standby state to instruct the vehicle to move to a target position. The target position may be, for example, a position of a facility such as a gas station or a charging station that is used to replenish energy for the vehicle. According to embodiments of the present disclosure, it is possible to upload an abnormal information to the server 104 in response to the vehicle 101, 102, or 103 being abnormal. In response to a receipt of the abnormal information of the vehicle, the server 104 may configure the vehicle to be in an abnormal state by setting the vehicle state configuration information of the vehicle, so that the abnormal vehicle will not receive a task.

In embodiments, the vehicle 101, 102, or 103 may be provided with a display device for presenting a prompt information to a user. The display device may include, for example, a liquid crystal display (LCD), an organic light-emitting diode (OLED), an active-matrix organic light-emitting diode (AMOLED), a flex light-emitting diode (FLED), a Mini-LED, a Micro-LED, a Micro-OLED, a quantum dot light-emitting diode (QLED), etc. The prompt information may include, for example, a color information, an image information, a text information, a video information, etc. For example, the display device may be disposed on a roof of the vehicle 101, 102, or 103. After the vehicle 101, 102, or 103 receives the task information, the prompt information corresponding to the task may be displayed to the user by the display device, so as to prompt the user.

In the technical solution of the present disclosure, the collection, storage, use, processing, transmission, provision, and disclosure of data related to vehicle information, task information, etc., all comply with the relevant laws and regulations, and do not violate public order and good customs.

Figure 2:
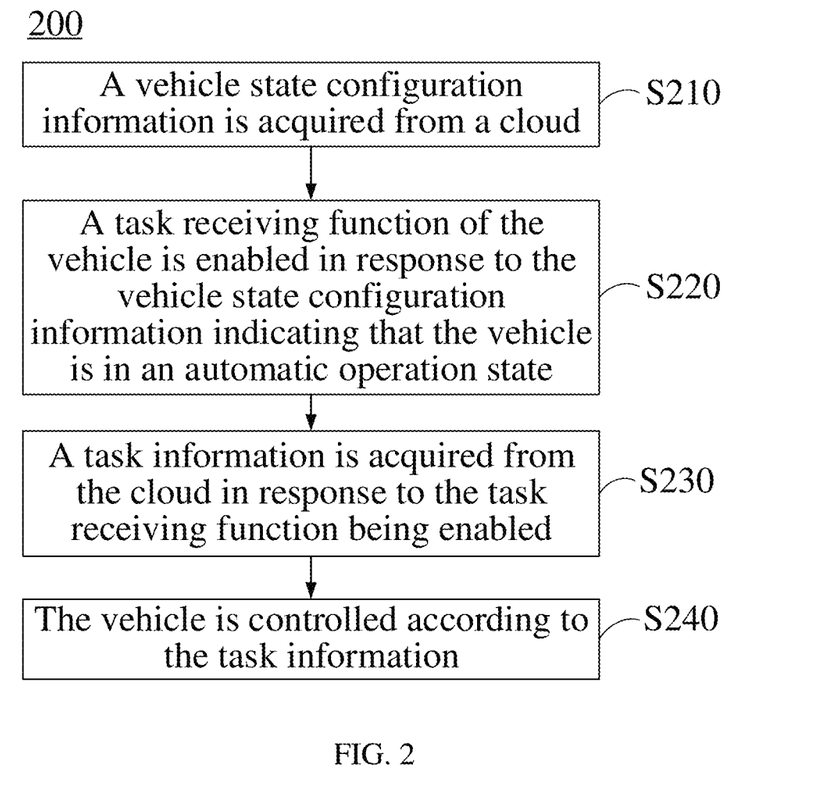
FIG. 2 schematically shows a flowchart of a method of controlling an autonomous vehicle according to embodiments of the present disclosure.

FIG. 2 schematically shows a flowchart of a method of controlling an autonomous vehicle according to embodiments of the present disclosure. For example, a method 200 may be implemented by a vehicle control apparatus which may be provided, for example, in the vehicle as described above.

As shown in FIG. 2, the method 200 includes operations S210 to S240.

In operation S210, a vehicle state configuration information is acquired from a cloud.

According to embodiments of the present disclosure, the vehicle state configuration information may be used to indicate a vehicle state of a vehicle. The cloud may configure the vehicle state of the vehicle and store the vehicle state in the vehicle state configuration information corresponding to the vehicle. The vehicle may acquire the vehicle state configuration information corresponding to itself from the cloud, and then determine a current vehicle state of the vehicle according to the vehicle state configuration information.

For example, in this embodiment, the vehicle state may include an automatic operation state, a manual operation state, and/or the like. The automatic operation state indicates that the vehicle may automatically receive a task and process the task. The manual operation state indicates that the vehicle needs to receive a task and process the task under a control of a safety officer.

In operation S220, a task receiving function of the vehicle is enabled in response to the vehicle state configuration information indicating that the vehicle is in an automatic operation state.

According to embodiments of the present disclosure, the task receiving function of the vehicle may be enabled when the vehicle is in the automatic operation state, so that the vehicle may independently receive and process the task.

In operation S230, a task information is acquired from the cloud in response to the task receiving function being enabled.

According to embodiments of the present disclosure, the vehicle may automatically acquire the task information from the cloud when the task receiving function of the vehicle is enabled. The task information may include, for example, a task identification (ID), a user information, a real-time state of the task, a starting position, an ending position, etc.

In operation S240, the vehicle is controlled according to the task information.

According to embodiments of the present disclosure, the vehicle may perform a corresponding operation according to the task information. Taking a passenger transport task as an example, a task information of the passenger transport task may include, for example, a real-time state of the task and a starting position. The real-time state of the task indicates that the task is currently in a state of waiting to pick up a user. Based on this, the vehicle may move to the starting position according to the task information to pick up the user.

In a related technology, when the autonomous vehicle receives the task, it needs the safety officer to operate. The method of controlling the autonomous vehicle according to embodiments of the present disclosure may achieve that the vehicle automatically receives the task, thereby eliminating the safety officer and improving a degree of intelligence.

Figure 3:
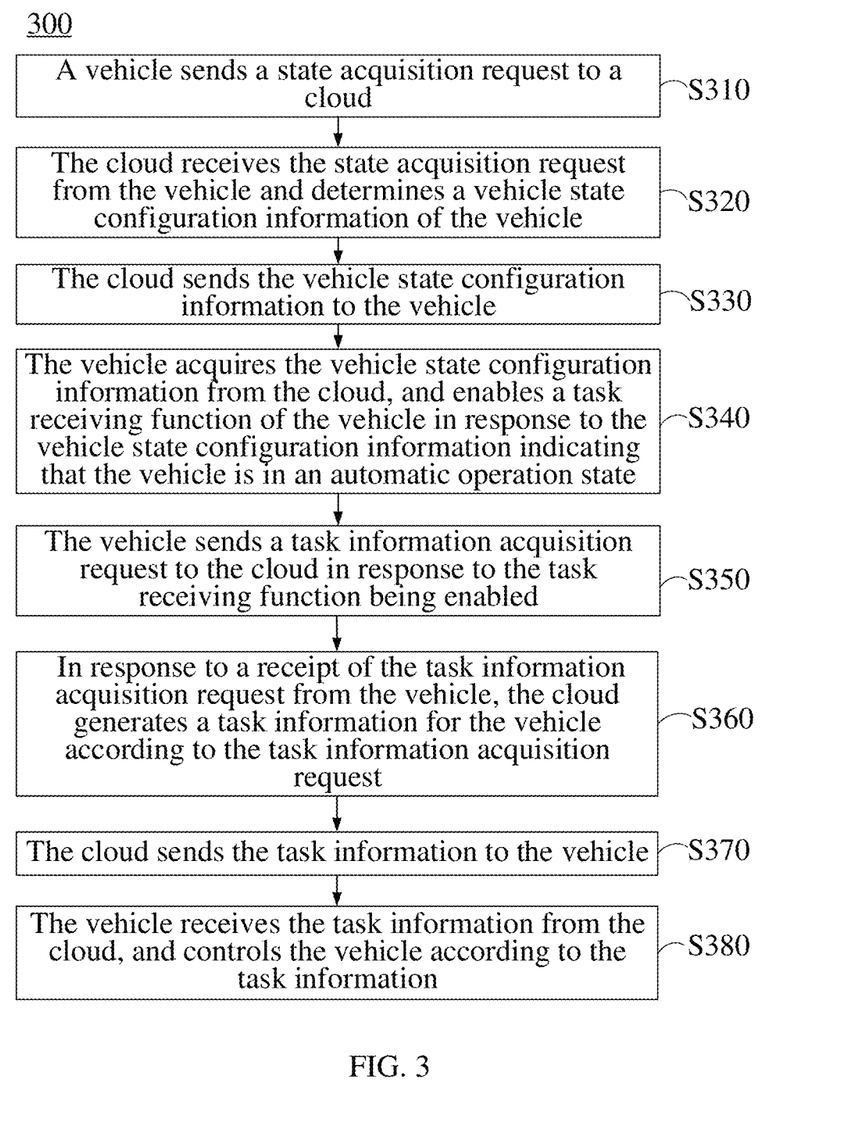
FIG. 3 schematically shows a flowchart of a method of controlling an autonomous vehicle according to embodiments of the present disclosure.

FIG. 3 schematically shows a flowchart of a method of controlling an autonomous vehicle according to embodiments of the present disclosure.

As shown in FIG. 3, the method includes operations S310 to S380.

In operation S310, a vehicle sends a state acquisition request to a cloud.

According to embodiments of the present disclosure, the state acquisition request may be used to request to acquire a vehicle state configuration information corresponding to the vehicle. The vehicle state configuration information may be used to indicate a vehicle state of the vehicle. The vehicle state may include, for example, an automatic operation state, a manual operation state, etc. The state acquisition request may include, for example, a vehicle ID of the vehicle.

In operation S320, the cloud receives the state acquisition request from the vehicle and determines the vehicle state configuration information of the vehicle.

According to embodiments of the present disclosure, after receiving the state acquisition request from the vehicle, the cloud may acquire the vehicle ID according to the state acquisition request, and then determine the vehicle state configuration information corresponding to the vehicle ID.

In operation S330, the cloud sends the vehicle state configuration information to the vehicle.

In operation S340, the vehicle acquires the vehicle state configuration information from the cloud, and enables a task receiving function of the vehicle in response to the vehicle state configuration information indicating that the vehicle is in the automatic operation state.

In operation S350, the vehicle sends a task information acquisition request to the cloud in response to the task receiving function being enabled.

According to embodiments of the present disclosure, the task information acquisition request may be used to request to acquire a task information. The task information acquisition request may include, for example, the vehicle ID of the vehicle.

In operation S360, in response to a receipt of the task information acquisition request from the vehicle, the cloud generates the task information for the vehicle according to the task information acquisition request.

According to embodiments of the present disclosure, after receiving the task information acquisition request, the cloud may acquire the vehicle ID according to the task information acquisition request. Then the cloud determines whether a task corresponding to the vehicle ID currently exists or not. If no task exists, acquiring an unprocessed task and binding the unprocessed task with the vehicle ID to generate the task information for the vehicle. If the task already exists, a current task information of the task is acquired.

In operation S370, the cloud sends the task information to the vehicle.

In operation S380, the vehicle receives the task information from the cloud, and controls the vehicle according to the task information.

According to embodiments of the present disclosure, the task information may include a user personalization information. Based on this, the cloud may acquire a starting position corresponding to a task and a user personalization information corresponding to the task. Then the task information is generated according to the starting position and the user personalization information. After acquiring the task information, the vehicle may move to the starting position. Then, in response to an arrival of the vehicle at the starting position, the prompt information is presented by the display device of the vehicle according to the user personalization information. The prompt information may be used to prompt the user that the vehicle has arrived. In an example, the user personalization information may include, for example, a color information. Based on this, the vehicle may use a color indicated by the color information to present the prompt information, so as to facilitate user identification.

According to embodiments of the present disclosure, for example, the vehicle may send the state acquisition request to the cloud repeatedly at a first frequency. The cloud sends a current vehicle state configuration information of the vehicle to the vehicle every time it receives the state acquisition request. Thus, the vehicle state configuration information in the vehicle may be synchronized with the cloud. According to embodiments of the present disclosure, the first frequency may be determined as required in practice. For example, in this embodiment, the first frequency may be 5 seconds/time.

According to embodiments of the present disclosure, for example, the vehicle may send the task information acquisition request to the cloud repeatedly at a second frequency. The cloud sends a current task information corresponding to the vehicle to the vehicle every time it receives the task information acquisition request. Thus, the task information in the vehicle may be synchronized with the cloud. According to embodiments of the present disclosure, the second frequency may be determined as required in practice. For example, in this embodiment, the second frequency may be 2 seconds/time.

According to embodiments of the present disclosure, the vehicle state may include a standby state. The cloud may configure the vehicle to be in the standby state by setting the vehicle state configuration information of the vehicle. Based on this, FIG. 4 schematically shows a flowchart of a method of controlling an autonomous vehicle according to embodiments of the present disclosure.

Figure 4:
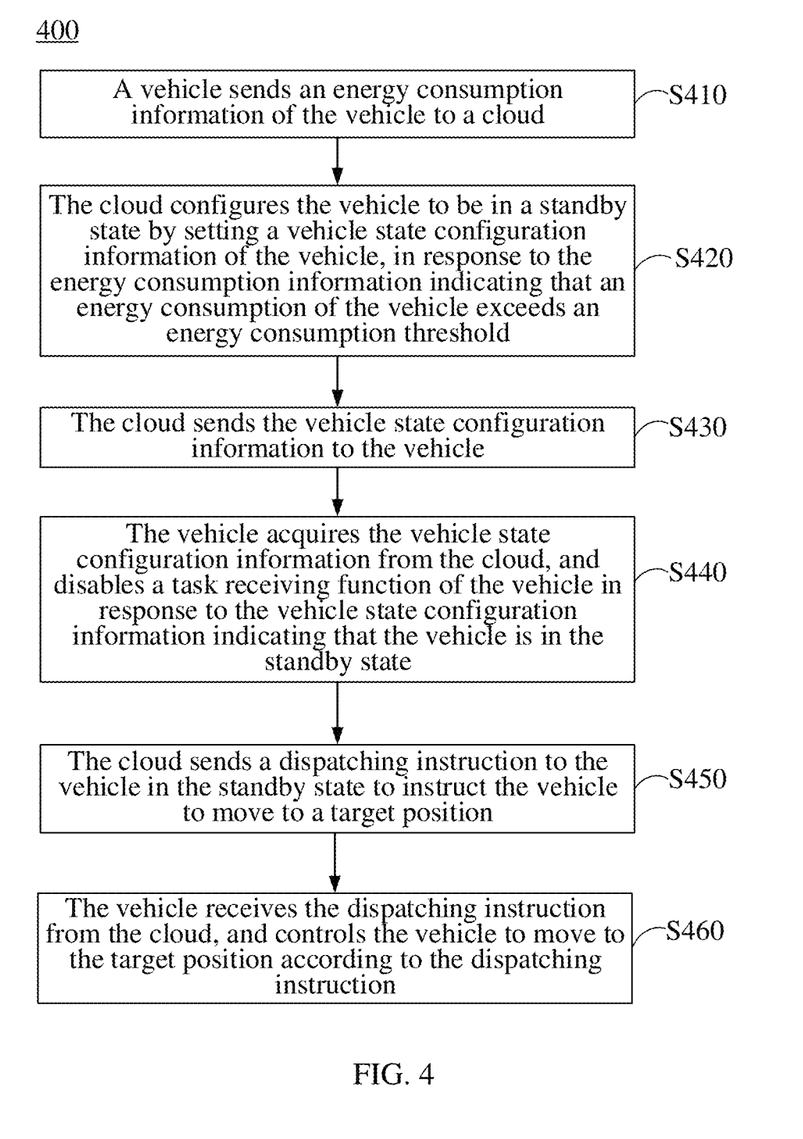
FIG. 4 schematically shows a flowchart of a method of controlling an autonomous vehicle according to embodiments of the present disclosure.

As shown in FIG. 4, a method 400 of controlling the autonomous vehicle may include operations S410 to S460.

In operation S410, a vehicle sends an energy consumption information of the vehicle to a cloud.

In operation S420, the cloud configures the vehicle to be in a standby state by setting a vehicle state configuration information of the vehicle, in response to the energy consumption information indicating that an energy consumption of the vehicle exceeds an energy consumption threshold.

In operation S430, the cloud sends the vehicle state configuration information to the vehicle.

In operation S440, the vehicle acquires the vehicle state configuration information from the cloud, and disables a task receiving function of the vehicle in response to the vehicle state configuration information indicating that the vehicle is in the standby state.

In operation S450, the cloud sends a dispatching instruction to the vehicle in the standby state to instruct the vehicle to move to a target position.

In operation S460, the vehicle receives the dispatching instruction from the cloud, and controls the vehicle to move to the target position according to the dispatching instruction.

According to embodiments of the present disclosure, the energy consumption information may include, for example, a fuel consumption information, a power consumption information, etc. The energy consumption threshold may be set as required in practice, which is not specifically limited in the present disclosure. The dispatching instruction may be used to instruct the vehicle to move to the target position. The target position may include, for example, a position of a facility such as a gas station or a charging station that is used to replenish energy for the vehicle.

According to embodiments of the present disclosure, by acquiring the energy consumption information of the vehicle, before the energy of the vehicle is exhausted, it is possible to inform the vehicle that its current state has changed to the standby state by sending the vehicle state configuration information indicating that the vehicle is in the standby state to the vehicle, and then disable the task receiving function of the vehicle, so as to prevent the vehicle from stopping due to energy depletion during task processing. In addition, the cloud may dispatch the vehicle to the target position for energy replenishment by sending the dispatching instruction to the vehicle.

According to embodiments of the present disclosure, the vehicle state may include an abnormal state. The cloud may configure the vehicle to be in the abnormal state by setting the vehicle state configuration information of the vehicle. Based on this, FIG. 5 schematically shows a flowchart of a method of controlling an autonomous vehicle according to embodiments of the present disclosure.

Figure 5:
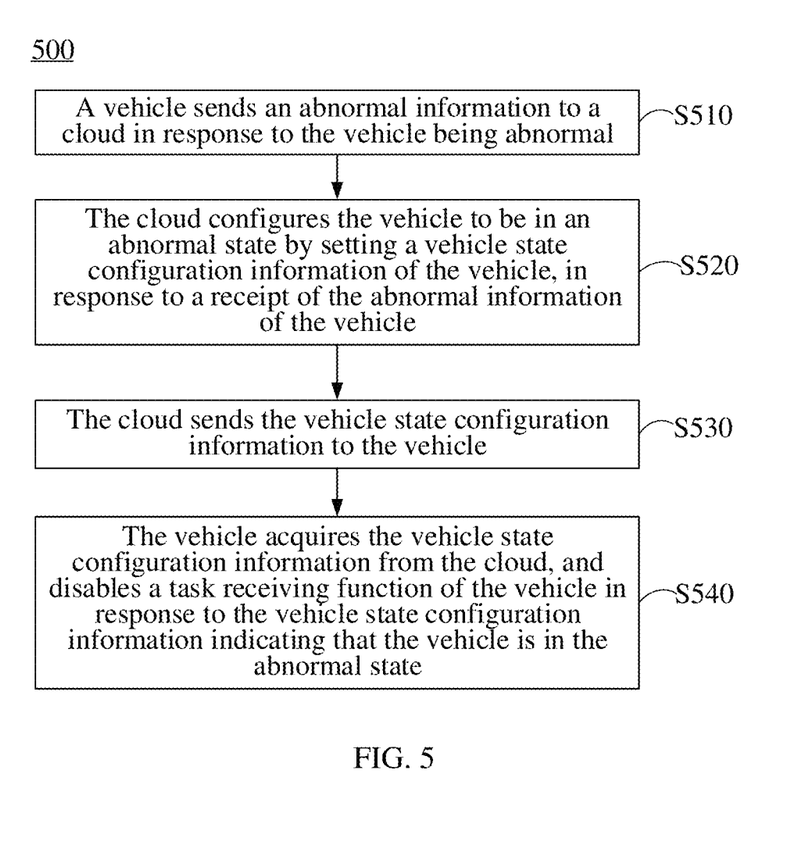
FIG. 5 schematically shows a flowchart of a method of controlling an autonomous vehicle according to embodiments of the present disclosure.

As shown in FIG. 5, a method 500 of controlling the autonomous vehicle may include operations S510 to S540.

In operation S510, a vehicle sends an abnormal information to a cloud in response to the vehicle being abnormal.

In operation S520, in response to a receipt of the abnormal information of the vehicle, the cloud configures the vehicle to be in an abnormal state by setting a vehicle state configuration information of the vehicle.

In operation S530, the cloud sends the vehicle state configuration information to the vehicle.

In operation S540, the vehicle acquires the vehicle state configuration information from the cloud, and disables a task receiving function of the vehicle in response to the vehicle state configuration information indicating that the vehicle is in the abnormal state.

According to embodiments of the present disclosure, the vehicle is configured to be in the abnormal state by setting the vehicle state configuration information of the vehicle in response to the abnormal information being received. When assigning a task, if the vehicle is currently in the abnormal state, it will not be assigned the task, so that the vehicle in the abnormal state will not undertake and process the task. In addition, after receiving the abnormal information of the vehicle, the cloud may perform a corresponding operation, such as collecting abnormal data, troubleshooting, dispatching maintenance personnel, etc., to solve an abnormal situation of the vehicle.

Figure 6:
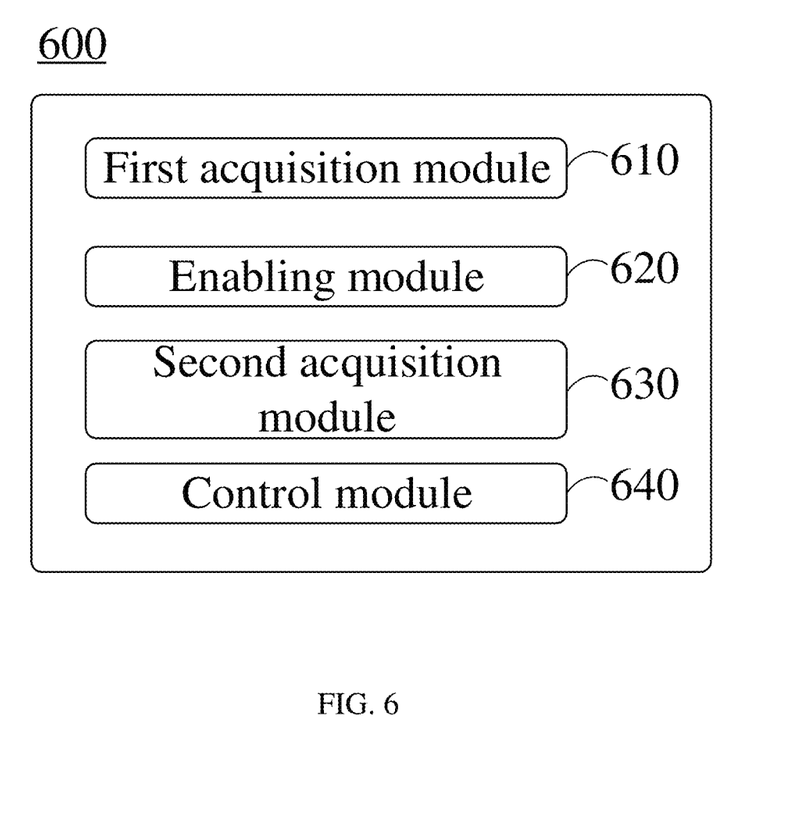
FIG. 6 schematically shows a block diagram of an apparatus of controlling an autonomous vehicle according to embodiments of the present disclosure.

FIG. 6 schematically shows a block diagram of an apparatus of controlling an autonomous vehicle according to embodiments of the present disclosure.

As shown in FIG. 6, an apparatus 600 of controlling the autonomous vehicle includes a first acquisition module 610, an enabling module 620, a second acquisition module 630, and a control module 640.

The first acquisition module 610 is used to acquire a vehicle state configuration information from a cloud.

The enabling module 620 is used to enable a task receiving function of a vehicle, in response to the vehicle state configuration information indicating that the vehicle is in an automatic operation state.

The second acquisition module 630 is used to acquire a task information from the cloud in response to the task receiving function being enabled.

The control module 640 is used to control the vehicle according to the task information.

Figure 7:
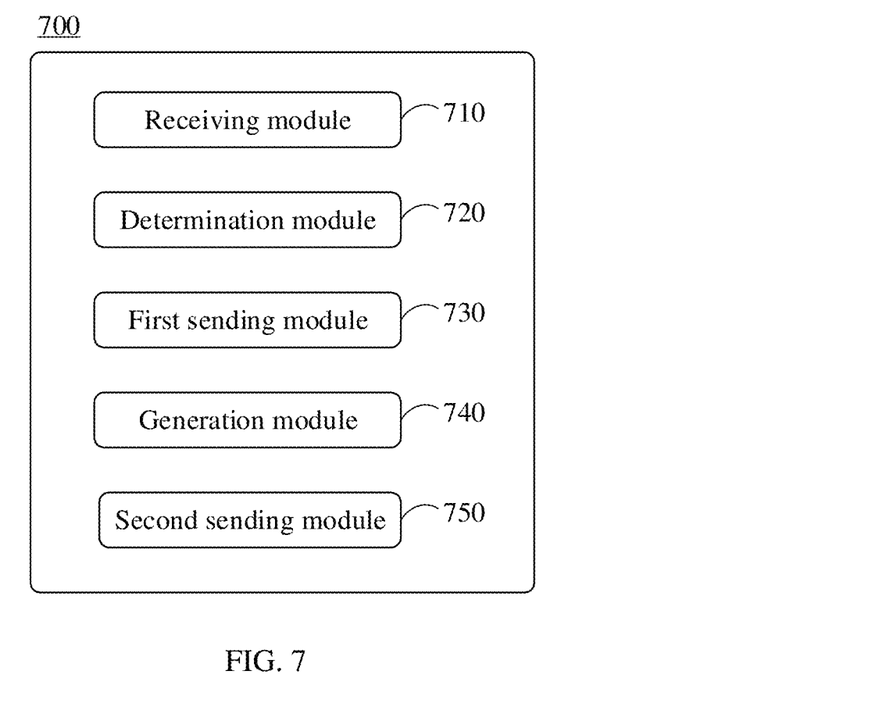
FIG. 7 schematically shows a block diagram of an apparatus of controlling an autonomous vehicle according to embodiments of the present disclosure.

FIG. 7 schematically shows a block diagram of an apparatus of controlling an autonomous vehicle according to embodiments of the present disclosure.

As shown in FIG. 7, an apparatus 700 of controlling the autonomous vehicle includes a receiving module 710, a determination module 720, a first sending module 730, a generation module 740, and a second sending module 750.

The receiving module 710 is used to receive a state acquisition request from a vehicle.

The determination module 720 is used to determine a vehicle state configuration information of the vehicle, where the vehicle state configuration information is used to indicate a vehicle state of the vehicle.

The first sending module 730 is used to send the vehicle state configuration information to the vehicle.

The generation module 740 is used to: in response to a receipt of a task information acquisition request from the vehicle, generate a task information for the vehicle according to the task information acquisition request.

The second sending module 750 is used to send the task information to the vehicle.

According to embodiments of the present disclosure, the present disclosure further provides an electronic device, a readable storage medium, and a computer program product.

Figure 8:
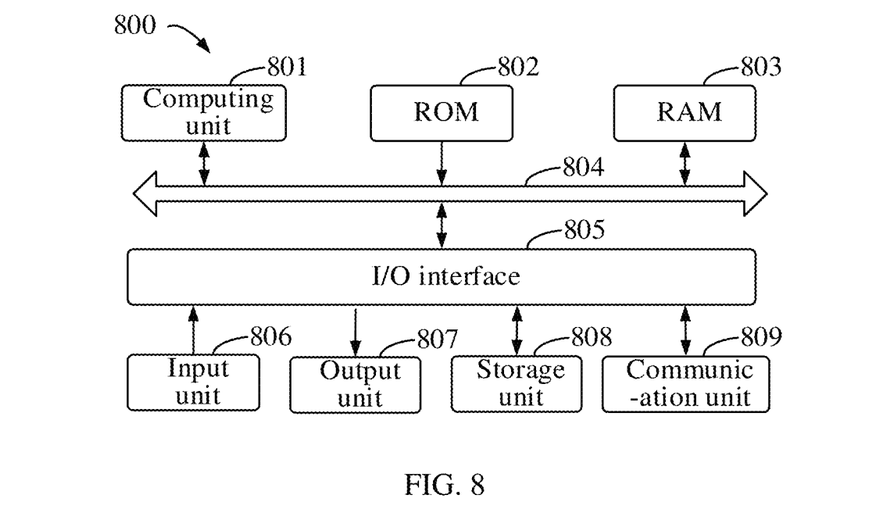
FIG. 8 schematically shows a block diagram of an example electronic device for implementing embodiments of the present disclosure.

FIG. 8 shows a schematic block diagram of an exemplary electronic device 800 for implementing embodiments of the present disclosure. The electronic device is intended to represent various forms of digital computers, such as a laptop computer, a desktop computer, a workstation, a personal digital assistant, a server, a blade server, a mainframe computer, and other suitable computers. The electronic device may further represent various forms of mobile devices, such as a personal digital assistant, a cellular phone, a smart phone, a wearable device, and other similar computing devices. The components as illustrated herein, and connections, relationships, and functions thereof are merely examples, and are not intended to limit the implementation of the present disclosure described and/or required herein.

As shown in FIG. 8, the device 800 may include a computing unit 801, which may perform various appropriate actions and processing based on a computer program stored in a read-only memory (ROM) 802 or a computer program loaded from a storage unit 808 into a random access memory (RAM) 803. Various programs and data required for the operation of the device 800 may be stored in the RAM 803. The computing unit 801, the ROM 802 and the RAM 803 are connected to each other through a bus 804. An input/output (I/O) interface 805 is further connected to the bus 804.

Various components in the device 800, including an input unit 806 such as a keyboard, a mouse, etc., an output unit 807 such as various types of displays, speakers, etc., a storage unit 808 such as a magnetic disk, an optical disk, etc., and a communication unit 809 such as a network card, a modem, a wireless communication transceiver, etc., are connected to the I/O interface 805. The communication unit 809 allows the device 800 to exchange information/data with other devices through a computer network such as the Internet and/or various telecommunication networks.

The computing unit 801 may be various general-purpose and/or special-purpose processing components with processing and computing capabilities. Some examples of the computing unit 801 include but are not limited to a central processing unit (CPU), a graphics processing unit (GPU), various dedicated artificial intelligence (AI) computing chips, various computing units running machine learning model algorithms, a digital signal processor (DSP), and any appropriate processor, controller, microcontroller, and so on. The computing unit 801 may perform the various methods and processes described above, such as the methods of controlling the autonomous vehicle. For example, in some embodiments, the methods of controlling the autonomous vehicle may be implemented as a computer software program that is tangibly contained on a machine-readable medium, such as the storage unit 808. In some embodiments, part or all of a computer program may be loaded and/or installed on the device 800 via the ROM 802 and/or the communication unit 809. When the computer program is loaded into the RAM 803 and executed by the computing unit 801, one or more steps of the methods of controlling the autonomous vehicle described above may be performed. Alternatively, in other embodiments, the computing unit 801 may be configured to perform the methods of controlling the autonomous vehicle in any other appropriate way (for example, by means of firmware).

Various embodiments of the systems and technologies described herein may be implemented in a digital electronic circuit system, an integrated circuit system, a field programmable gate array (FPGA), an application specific integrated circuit (ASIC), an application specific standard product (ASSP), a system on chip (SOC), a complex programmable logic device (CPLD), a computer hardware, firmware, software, and/or combinations thereof. These various embodiments may be implemented by one or more computer programs executable and/or interpretable on a programmable system including at least one programmable processor. The programmable processor may be a special-purpose or general-purpose programmable processor, which may receive data and instructions from the storage system, the at least one input device and the at least one output device, and may transmit the data and instructions to the storage system, the at least one input device, and the at least one output device.

Program codes for implementing the methods of the present disclosure may be written in any combination of one or more programming languages. These program codes may be provided to a processor or a controller of a general-purpose computer, a special-purpose computer, or other programmable data processing devices, so that when the program codes are executed by the processor or the controller, the functions/operations specified in the flowchart and/or block diagram may be implemented. The program codes may be executed completely on the machine, partly on the machine, partly on the machine and partly on the remote machine as an independent software package, or completely on the remote machine or the server.

In the context of the present disclosure, the machine readable medium may be a tangible medium that may contain or store programs for use by or in combination with an instruction execution system, device or apparatus. The machine readable medium may be a machine-readable signal medium or a machine-readable storage medium. The machine readable medium may include, but not be limited to, electronic, magnetic, optical, electromagnetic, and infrared or semiconductor systems, devices or apparatuses, or any suitable combination of the above. More specific examples of the machine readable storage medium may include electrical connections based on one or more wires, portable computer disks, hard disks, random access memory (RAM), read-only memory (ROM), erasable programmable read-only memory (EPROM or flash memory), optical fiber, convenient compact disk read-only memory (CD-ROM), optical storage device, magnetic storage device, or any suitable combination of the above.

In order to provide interaction with users, the systems and techniques described here may be implemented on a computer including a display device (for example, a CRT (cathode ray tube) or LCD (liquid crystal display) monitor) for displaying information to the user), and a keyboard and a pointing device (for example, a mouse or a trackball) through which the user may provide the input to the computer. Other types of devices may also be used to provide interaction with users. For example, a feedback provided to the user may be any form of sensory feedback (for example, visual feedback, auditory feedback, or tactile feedback), and the input from the user may be received in any form (including acoustic input, voice input or tactile input).

The systems and technologies described herein may be implemented in a computing system including back-end components (for example, a data server), or a computing system including middleware components (for example, an application server), or a computing system including front-end components (for example, a user computer having a graphical user interface or web browser through which the user may interact with the implementation of the system and technology described herein), or a computing system including any combination of such back-end components, middleware components or front-end components. The components of the system may be connected to each other by digital data communication (for example, a communication network) in any form or through any medium. Examples of the communication network include a local area network (LAN), a wide area network (WAN), and Internet.

The computer system may include a client and a server. The client and the server are generally far away from each other and usually interact through a communication network. The relationship between the client and the server is generated through computer programs running on the corresponding computers and having a client-server relationship with each other.

The server may be the cloud server, also referred to as the cloud computing server or the cloud host, which is the host product in the cloud computing service system to solve shortcomings of difficult management and weak business scalability in conventional physical host and VPS service. The server may also be the server of the distributed system, or the combined with the blockchain.

It should be understood that steps of the processes illustrated above may be reordered, added or deleted in various manners. For example, the steps described in the present disclosure may be performed in parallel, sequentially, or in a different order, as long as a desired result of the technical solution of the present disclosure may be achieved. This is not limited in the present disclosure.

The above-mentioned specific embodiments do not constitute a limitation on the scope of protection of the present disclosure. Those skilled in the art should understand that various modifications, combinations, sub-combinations and substitutions may be made according to design requirements and other factors. Any modifications, equivalent replacements and improvements made within the spirit and principles of the present disclosure shall be contained in the scope of protection of the present disclosure.

What is claimed is:

1. A method of controlling an autonomous vehicle, the method comprising:
   acquiring a vehicle state configuration information from a cloud;
   enabling a task receiving function of the vehicle, in response to the vehicle state configuration information indicating that the vehicle is in an automatic operation state;
   acquiring a task information from the cloud in response to the task receiving function being enabled; and
   controlling the vehicle according to the task information.

2. The method according to claim 1, wherein the acquiring a vehicle state configuration information from a cloud comprises:
   sending a state acquisition request to the cloud repeatedly at a first frequency; and
   receiving the vehicle state configuration information from the cloud, wherein the vehicle state configuration information corresponds to the state acquisition request.

3. The method according to claim 1, wherein the acquiring a task information from the cloud comprises:
   sending a task information acquisition request to the cloud repeatedly at a second frequency; and
   receiving the task information from the cloud, wherein the task information corresponds to the task information acquisition request.

4. The method according to claim 1, the method further comprising:
   in response to the vehicle state configuration information indicating that the vehicle is in a standby state,
   disabling the task receiving function of the vehicle;
   receiving a dispatching instruction from the cloud; and
   controlling the vehicle to move to a target position according to the dispatching instruction.

5. The method according to claim 1, the method further comprising:
   in response to the vehicle being in an abnormal state, sending an abnormal information to the cloud so that the cloud configures the vehicle to be in the abnormal state; and
   disabling the task receiving function of the vehicle in response to the vehicle state configuration information indicating that the vehicle is in the abnormal state.

6. The method according to claim 1, wherein the task information comprises a starting position, and the controlling the vehicle according to the task information comprises:
   controlling the vehicle to move to the starting position.

7. The method according to claim 6, wherein the task information further comprises a user personalization information, and the controlling the vehicle according to the task information further comprises:
   in response to an arrival of the vehicle at the starting position,
   presenting, by a display device of the vehicle, a prompt information according to the user personalization information.

8. The method according to claim 7, wherein the user personalization information comprises a color information, and the presenting, by a display device of the vehicle, a prompt information according to the user personalization information comprises:
   presenting the prompt information in a color indicated by the color information.

9. A method of controlling an autonomous vehicle, the method comprising:
   receiving a state acquisition request from the vehicle;
   determining a vehicle state configuration information of the vehicle, wherein the vehicle state configuration information is configured to indicate a vehicle state of the vehicle;
   sending the vehicle state configuration information to the vehicle;
   in response to a receipt of a task information acquisition request from the vehicle, generating a task information for the vehicle according to the task information acquisition request; and
   sending the task information to the vehicle.

10. The method according to claim 9, the method further comprising:
    configuring the vehicle to be in an automatic operation state by setting the vehicle state configuration information of the vehicle, in response to the vehicle meeting an automatic operation condition.

11. The method according to claim 9, the method further comprising:
acquiring an energy consumption information of the vehicle;
configuring the vehicle to be in a standby state by setting the vehicle state configuration information of the vehicle, in response to the energy consumption information indicating that an energy consumption of the vehicle exceeds an energy consumption threshold; and
sending a dispatching instruction to the vehicle in the standby state to instruct the vehicle to move to a target position.

12. The method according to claim 9, the method further comprising:
configuring the vehicle to be in an abnormal state by setting the vehicle state configuration information of the vehicle, in response to a receipt of an abnormal information of the vehicle.

13. The method according to claim 9, the method further comprising:
acquiring a starting position corresponding to a task and a user personalization information corresponding to the task, wherein the user personalization information comprises a color information; and
generating the task information according to the starting position and the user personalization information.

14. An electronic device, comprising:
at least one processor; and
a memory communicatively connected to the at least one processor, wherein the memory stores instructions executable by the at least one processor, and the instructions, when executed by the at least one processor, cause the at least one processor to:
acquire a vehicle state configuration information from a cloud;
enable a task receiving function of the vehicle, in response to the vehicle state configuration information indicating that the vehicle is in an automatic operation state;
acquire a task information from the cloud in response to the task receiving function being enabled; and
control the vehicle according to the task information.

15. The electronic device according to claim 14, wherein the instructions are further configured to cause the at least one processor to at least:
send a state acquisition request to the cloud repeatedly at a first frequency; and
receive the vehicle state configuration information from the cloud, wherein the vehicle state configuration information corresponds to the state acquisition request.

16. The electronic device according to claim 14, wherein the instructions are further configured to cause the at least one processor to at least:
send a task information acquisition request to the cloud repeatedly at a second frequency; and
receive the task information from the cloud, wherein the task information corresponds to the task information acquisition request.

17. The electronic device according to claim 14, wherein the instructions are further configured to cause the at least one processor to at least:
in response to the vehicle state configuration information indicating that the vehicle is in a standby state,
disable the task receiving function of the vehicle;
receive a dispatching instruction from the cloud; and
control the vehicle to move to a target position according to the dispatching instruction.

18. The electronic device according to claim 14, wherein the instructions are further configured to cause the at least one processor to at least:
in response to the vehicle being in an abnormal state, send an abnormal information to the cloud so that the cloud configures the vehicle to be in the abnormal state; and
disable the task receiving function of the vehicle in response to the vehicle state configuration information indicating that the vehicle is in the abnormal state.

19. An electronic device, comprising:
at least one processor; and
a memory communicatively connected to the at least one processor, wherein the memory stores instructions executable by the at least one processor, and the instructions, when executed by the at least one processor, cause the at least one processor to:
receive a state acquisition request from the vehicle;
determine a vehicle state configuration information of the vehicle, wherein the vehicle state configuration information is configured to indicate a vehicle state of the vehicle;
send the vehicle state configuration information to the vehicle;
in response to a receipt of a task information acquisition request from the vehicle, generate a task information for the vehicle according to the task information acquisition request; and
send the task information to the vehicle.

20. The electronic device according to claim 19, wherein the instructions are further configured to cause the at least one processor to at least:
acquire an energy consumption information of the vehicle;
configure the vehicle to be in a standby state by setting the vehicle state configuration information of the vehicle, in response to the energy consumption information indicating that an energy consumption of the vehicle exceeds an energy consumption threshold; and
send a dispatching instruction to the vehicle in the standby state to instruct the vehicle to move to a target position.

* * * * *